United States Patent [19]
Ritzow et al.

[11] 3,927,643
[45] Dec. 23, 1975

[54] AQUARIUM

[76] Inventors: Gerald R. Ritzow, 6300 Parkview Road, Greendale, Wis. 53129; Roger C. Ritzow, S53 W23581 Big Bend Road, Waukesha, Wis. 53186

[22] Filed: July 31, 1974

[21] Appl. No.: 493,257

[52] U.S. Cl. .................................................. 119/5
[51] Int. Cl.² ............................................ A01K 64/00
[58] Field of Search ............... 119/5; 220/4 R, 82 R; 229/41 C, 41 D

[56] References Cited
UNITED STATES PATENTS

| | | | |
|---|---|---|---|
| 3,287,041 | 11/1966 | Cohen | 119/5 X |
| 3,472,381 | 10/1969 | Halpert | 119/5 X |
| 3,651,975 | 3/1972 | Callan | 119/5 X |
| 3,696,789 | 10/1972 | Richard | 119/5 |
| 3,759,224 | 9/1973 | Hall | 119/5 |

*Primary Examiner*—Hugh R. Chamblee
*Attorney, Agent, or Firm*—Michael, Best & Friedrich

[57] ABSTRACT

A container comprising a plurality of glass side panels arranged in a hexagonal shape with the side panels fastened together at the edges with a mitered joint using an adhesive applied to the adjacent surfaces of the panel edges. A bottom hexagonal glass panel is positioned adjacent the bottom edges of the side panel subassembly with the bottom edges of said side panels resting on the top peripheral edge surface of said bottom panel and with the areas of contact having an adhesive applied thereto. A plurality of bottom molding members are fastened to the bottom panel and side panels at the joint therebetween. A top molding strip is fastened to the top edges of the side panels. Such molding strip is in the form of a single length of channel shaped material having a plurality of spaced notches in the sides thereof so that the top molding member can be folded into a hexagonal shape for installation on the top of the container.

5 Claims, 5 Drawing Figures

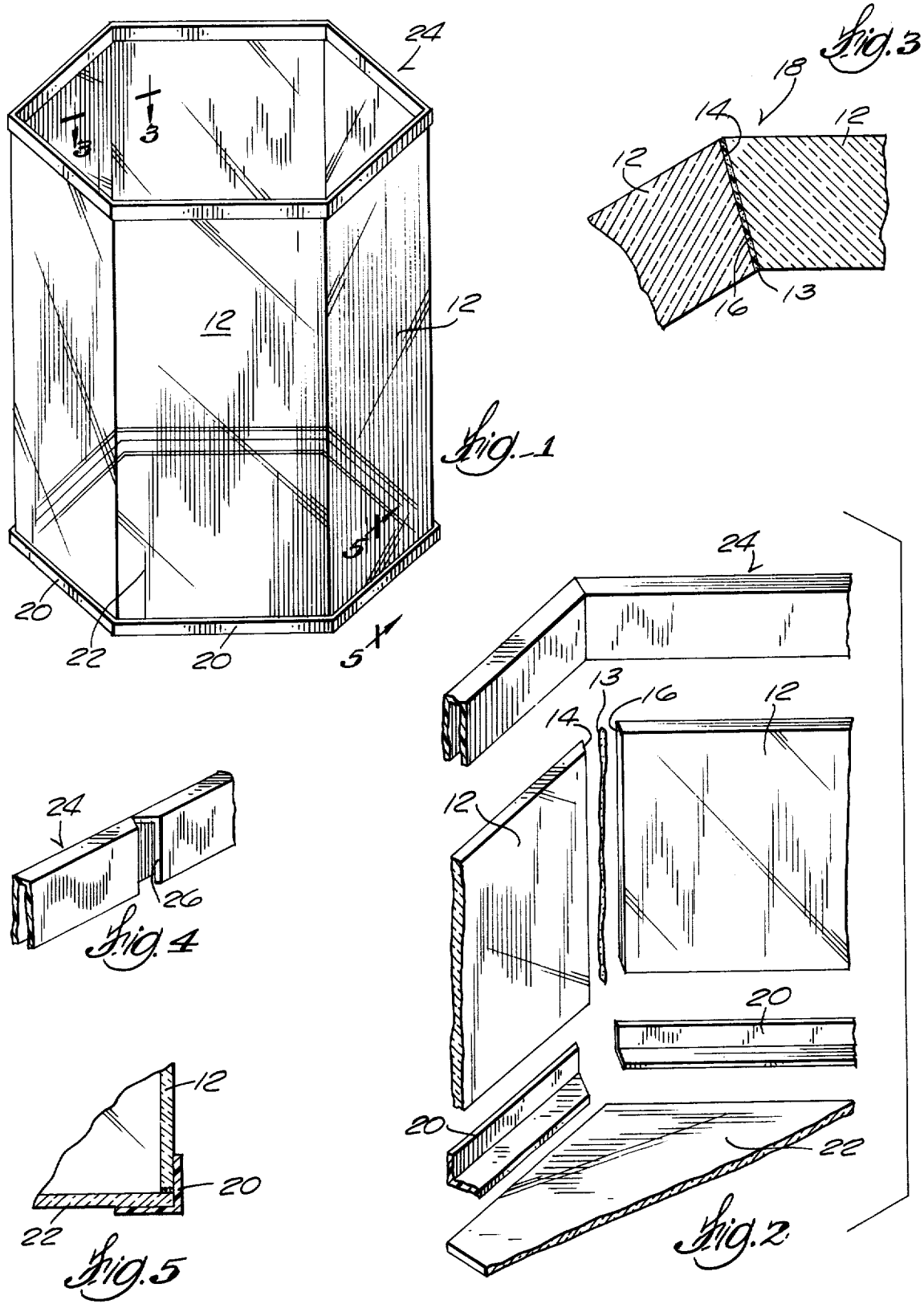

AQUARIUM

BACKGROUND OF THE INVENTION

I. Field of the Invention

This invention relates to the construction of a hexagonal glass container particularly designed for use as an aquarium or terrarium and the method of fabricating the container.

II. Description of the Prior Art

In all prior hexagonal containers known to applicant the edges of the side panels are square as opposed to the beveled construction of the present invention. The resultant strength and appearance of such containers is inferior to that of the present invention and the method of fabrication is more costly.

SUMMARY OF THE INVENTION

A hexagonal glass container and method of fabrication comprising the steps of fabricating a hexagonal side panel assembly of six panels by beveling the edges of the panels and fastening them to each other by the use of a suitable adhesive. The side panel subassembly is then joined to a hexagonal shaped bottom panel by first adhering a plurality of angle shaped bottom molding members to the edges of the bottom panel and then attaching the side panel assembly to the bottom panel (with bottom molding members attached) by positioning one subassembly on the other with the bottom edges of the side panel subassembly in contact with the top peripheral surface of the bottom panel member. In such position the bottom side end portions of the side panel assembly will be in contact with the inside surface of the upstanding legs of the bottom molding members. The final step is the installation of a top molding member to the top edges of the side panel assembly, such member being in the form of a single length of channel shaped flexible material having a plurality of spaced notches in one side thereof so that the molding member can be folded into hexagonal shape and then installed on the top of the side panel assembly. All the attachment joints set forth above are made secure by applying an adhesive to the contacting surfaces of the various parts.

DESCRIPTION OF THE DRAWINGS

FIG. 1 is a perspective view of a glass container made in accordance with the present invention;

FIG. 2 is a fragmentary exploded view of the container shown in FIG. 1;

FIG. 3 is an enlarged fragmentary sectional view taken along line 3—3 of FIG. 1;

FIG. 4 is a fragmentary perspective view of the top molding member for the container showing the member before it was bent for assembly on the container; and FIG. 5 is an enlarged fragmentary sectional view taken along line 5—5.

DESCRIPTION OF THE PREFERRED EMBODIMENT

The first step in the fabrication of the completed unit 10 as shown in FIG. 1 is to bevel the edges of the side glass panel 12. In the preferred embodiment this is accomplished by a grinding operation which when completed provides a pair of beveled edges 14 and 16 on each panel.

The next step is to subassemble the side panel 12 into a hexagonal shape. This can be accomplished in any suitable manner such as applying an adhesive 13 to the edges 14 and 16 and then joining the panels together with a plurality of mitered joints indicated generally by reference numeral 18, as shown in FIG. 3. In the preferred embodiment a silicone type adhesive is utilized to securely fasten the panels together.

The next step is to assemble a hexagonal shaped glass bottom panel 22 to the side panel subassembly described above. This is accomplished by first fastening a plurality of angle shaped bottom molding members 20 to bottom glass panel 22 by the use of a silicone type adhesive applied between the underside peripheral edge portion of bottom panel 22 and the upper surface of the bottom leg of the molding members 20.

The next step is to assemble the side panel subassembly with the bottom panel subassembly to form a completed bottom joint as shown in FIG. 5. The two subassemblies are held together by a silicone type adhesive applied between the bottom edge of side panels 12 and the top peripheral surface of bottom panel 20 and also applying an adhesive between the upstanding legs of molding members 20 and the edge portion of panels 22 and 12 respectively.

The final step is to install a single piece top molding member 24 to the top edges of the side panel subassembly. As best shown in FIG. 4, molding member 24 is in the form of a single length of channel shaped material having a plurality of spaced notches 26 in one side thereof so that the molding member 24 can be folded for installation on the top of the container. When so folded the notches will be closed to provide a molding having a continuous smooth surface on all sides of the molding member as shown in FIG. 1. The molding member 24 is held firmly in place on the container by a silicone type adhesive. In the preferred embodiment molding members 20 and 24 are made of a vinyl plastic material. It will be appreciated that the steps of installing the bottom panel 22 to the side panel subassembly and installing the top molding member on the side panel subassembly can be reversed from the order of fabrication described above.

The assembly method described above can be relatively easily performed by semi-skilled workers and is adaptable for mass production methods of manufacture. The container resulting from the method is attractive and sturdy and is particularly suitable for use as an aquarium or terrarium.

We claim:

1. A container comprising:
    a plurality of glass side panels arranged in a hexagonal shape, said glass panels fastened together at the edges with a mitered joint using an adhesive applied to the adjacent surfaces of said panel edges;
    a bottom hexagonal panel positioned adjacent the bottom edges of said side panels with the bottom edges of said side panels resting on the top peripheral edge surface of said bottom panel and with the areas of contact having an adhesive applied thereto;
    a plurality of bottom molding members fastened to the bottom panel and side panels at the joint therebetween, said bottom molding members having an angle shape with one leg thereof adhered to the bottom panel by an adhesive and with the other leg thereof adhered to a side panel by an adhesive; and a single piece top molding strip fastened to the top edges of said side panels, said top molding strip being in the form of a single length of channel shaped material having a plurality of spaced notches in the sides thereof so that said top molding member can be folded into a hexagonal shape for installation on the top of the container, when so folded said notches will be closed to provide a molding having a continuous smooth surface on all sides of the molding member, said top molding member being held firmly in place on the container by an adhesive.

2. A container according to claim 1 in which said adhesive is a silicone type adhesive and said top and bottom molding members are made from a vinyl plastic material.

3. The method of fabricating a hexagonal glass container comprising the steps of:
  a. fabricating a hexagonal side panel subassembly of six glass panels by beveling the edges of said six panels and then fastening the panels to each other by the use of a suitable adhesive applied to the surfaces of the beveled edges;
  b. installing a hexagonal shaped bottom panel to the side panel subassembly by first adhering a plurality of angle shaped bottom molding members to the edges of said bottom panel by the use of a suitable adhesive and then attaching the side panel subassembly to the bottom panel and bottom molding member subassembly by positioning one subassembly on the other with the bottom edges of said side panel subassembly in contact with the top peripheral surface of said bottom panel member and with the bottom side end portions of said side panel subassembly in contact with the inside surface of the upstanding legs of said bottom molding members, said parts being fastened together by the application of an adhesive to the areas of contact; and
  c. installing a top molding member to the top edges of the side panel subassembly, said top molding member being in the form of a single length of channel shaped flexible material having a plurality of spaced notches in one side thereof so that the molding member can be folded into a hexagonal shape and then installed on the top edges of the side panel subassembly, said molding being held firmly in place on the side panel subassembly by an adhesive applied to the contacting surfaces of the parts.

4. The method according to claim 3 in which the adhesive referred to in steps (a), (b) and (c) is a silicone type adhesive.

5. The method according to claim 4 in which the molding strips referred to in steps (b) and (c) are made of vinyl plastic material.

* * * * *